(12) United States Patent
Lacazette

(10) Patent No.: US 11,852,769 B2
(45) Date of Patent: Dec. 26, 2023

(54) UTILIZATION OF GEOLOGIC ORIENTATION DATA

(71) Applicant: Geothermal Technologies, Inc., Bel Air, MD (US)

(72) Inventor: Alfred Lacazette, Lakewood, CO (US)

(73) Assignee: Geothermal Technologies, Inc., Bel Air, MD (US)

( * ) Notice: Subject to any disclaimer, the term of this patent is extended or adjusted under 35 U.S.C. 154(b) by 0 days.

(21) Appl. No.: 17/322,583

(22) Filed: May 17, 2021

(65) Prior Publication Data
US 2022/0365236 A1  Nov. 17, 2022

(51) Int. Cl.
*G01V 1/34* (2006.01)
*G06T 11/00* (2006.01)
*G01V 1/30* (2006.01)

(52) U.S. Cl.
CPC .............. *G01V 1/345* (2013.01); *G01V 1/301* (2013.01); *G01V 1/306* (2013.01); *G06T 11/003* (2013.01)

(58) Field of Classification Search
CPC ........ G01V 1/345; G01V 1/301; G01V 1/306; G01V 1/003
See application file for complete search history.

(56) References Cited

U.S. PATENT DOCUMENTS

2004/0098200 A1*  5/2004  Wentland ............... G01V 11/00
  702/2
2005/0171700 A1*  8/2005  Dean ...................... G01V 1/301
  702/16
2010/0161232 A1*  6/2010  Chen ...................... G01V 1/345
  702/16

(Continued)

OTHER PUBLICATIONS

Comerford et al., Control on Geothermal Heat Recovery From a Hot Sedimentary Aquifer in Guardbridge, Scotland: Field Measurements, Modelling and Long Term Sustainability, Geothermics, vol. 76, p. 125-140, Nov. 2018 (Year: 2018).*

(Continued)

*Primary Examiner* — Raymond L Nimox
(74) *Attorney, Agent, or Firm* — Sterne, Kessler, Goldstein & Fox P.L.L.C.

(57) ABSTRACT

Disclosed herein are system, apparatus, article of manufacture, method and/or computer program product embodiments, and/or combinations and sub-combinations thereof, for using direction-angles to identify geologic features and geologic attributes for use in geothermal, oil and gas, mining, and other applications. An example embodiment operates by receiving a discrete three-dimensional (3D) representation of a geologic volume comprising a set of 3D orientations, where each 3D orientation is represented as a set of direction-angles measured relative to a set of coordinate axes. The example embodiment further operates by receiving a set of other measurements of properties of the geologic volume. In response, the example embodiment operates by correlating the set of 3D orientations with the set of other measurements to generate a geologic correlation data structure. Subsequently, the example embodiment operates by identifying a geologic attribute or a geologic feature associated with the geologic volume based on the geologic correlation data structure.

18 Claims, 8 Drawing Sheets
(4 of 8 Drawing Sheet(s) Filed in Color)

(56) References Cited

U.S. PATENT DOCUMENTS

| | | | | |
|---|---|---|---|---|
| 2012/0197530 A1* | 8/2012 | Posamentier | ......... | G01V 1/362 |
| | | | | 702/14 |
| 2012/0197531 A1* | 8/2012 | Posamentier | ......... | G01V 1/345 |
| | | | | 702/14 |
| 2012/0197532 A1* | 8/2012 | Posamentier | ......... | G01V 1/345 |
| | | | | 702/14 |
| 2012/0320712 A1* | 12/2012 | Aqrawi | ......... | G01V 1/302 |
| | | | | 367/53 |
| 2014/0098639 A1* | 4/2014 | Ma | ......... | G01V 1/34 |
| | | | | 367/73 |
| 2014/0278115 A1* | 9/2014 | Bas | ......... | G01V 99/005 |
| | | | | 702/14 |
| 2015/0073715 A1* | 3/2015 | Aarre | ......... | G01V 1/306 |
| | | | | 702/14 |
| 2019/0011582 A1* | 1/2019 | Aarre | ......... | G01V 3/38 |
| 2019/0265373 A1* | 8/2019 | Ito | ......... | E21B 17/025 |
| 2020/0160173 A1* | 5/2020 | Pandey | ......... | G06N 3/08 |

OTHER PUBLICATIONS

Mudunuru, Maruti Kumar, et al. "Sequential geophysical and flow inversion to characterize fracture networks in subsurface systems." Statistical Analysis and Data Mining: The ASA Data Science Journal 10.5 (2017): 326-342. (Year: 2017).*

Hall, Jonathan, et al. "Automatic extraction and characterisation of geological features and textures front borehole images and core photographs." SPWLA Annual Logging Symposium. SPWLA, 1996. (Year: 1996).*

Van Dijk, Janpieter. "Analysis and modeling of fractured reservoirs." SPE Europec featured at EAGE Conference and Exhibition?. SPE, 1998. (Year: 1998).*

Marfurt et al., 3-D seismic attributes using a semblance-based coherency algorithm, Geophysics, vol. 63, No. 4 (Jul.-Aug. 1998), pp. 1150-1165.

Lacazette et al., "Rapid Structural Interpretation Utilizing Newly Developed Seismic Attributes: Interpretation Methodology and Workflows", AAPG Search and Discovery Article #90026, Apr. 18-21, 2004, 1 page.

Chopra, Satinder and Marfurt, Kurt J., Seismic Attributes for Prospect Identification and Reservoir Characterization, SEG Geophysical Developments Series No. 11, 2007, pp. 27-44 and 219-236.

"Technical Presentations," Web page <https://www.naturalfractures.com/technical.htm >, 114 pages, Sep. 10, 2016 to Apr. 11, 2021, retrieved from Internet Archive Wayback Machine on May 14, 2021 <https://web.archive.org/web/20210323200035/https://www.naturalfractures.com/technical.html>.

International Search Report and Written Opinion of the International Searching Authority directed to related International Patent Application No. PCT/US2022/029693, dated Sep. 29, 2022; 13 pages.

Comerford et al., "Controls on Geothermal Heat Recovery from a Hot Sedimentary Aquifer in Guardbridge, Scotland: Field Measurements, Modelling and Long Term Sustainability," Geothermics, vol. 76, Nov. 2018; 34 pages.

* cited by examiner

UTILIZATION OF GEOLOGIC ORIENTATION DATA

BACKGROUND

Geothermal heat is an excellent source of renewable energy as the Earth's temperature naturally increases with depth. Although there are many geothermal energy facilities around the world, these facilities are typically located in places with volcanic activity, which provide a high temperature, easily accessible resource for energy harvesting. Unfortunately, these volcanic regions are geographically limited. Hot thy rock is another potential source of geothermal energy, but nearly all projects attempting to harvest heat in this manner have failed. Hot sedimentary aquifers are widespread and represent and represent a new, promising, and very economical source for geothermal energy production.

In one example, volumetric structural attributes can be computed from reflection seismic data by determining, using semblance or another measure of similarity, the offsets of reflectors in a square set of reflection seismic traces and then computing a best-fit surface that describes those offsets. Values that are commonly computed are the dip-angle and dip-azimuth of the best-fit plane and various curvature attributes of the best-fit curved surface. Subsequently, dip-angle, dip-azimuth volumes are conventionally displayed by binning orientations by angle and azimuth. However, standard color mapping systems for dip-angle, dip-azimuth volumes use fixed-color maps that do not use the entire color range and can arbitrarily place similar orientations in different bins. The resulting images are unclear and difficult to interpret, and structural domains are not identified easily.

BRIEF DESCRIPTION OF THE FIGURES

The patent or application file contains at least one drawing executed in color. Copies of this patent or patent application publication with color drawing(s) will be provided by the Office upon request and payment of the necessary tee.

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Successful identification and exploitation of suitable hot sedimentary aquifers requires identifying and characterizing the structure and flow characteristics of subsurface strata. The embodiments disclosed herein will assist these tasks. In addition, the embodiments disclosed herein are applicable to other industries and to solving other types of geologic problems. For example, the embodiments disclosed herein can be utilized for visualizing geologic orientation data for use in geothermal site selection. In another example, the embodiments disclosed herein can be utilized for using geologic orientation data for machine learning applications. In yet another example, the embodiments disclosed herein can be utilized for geothermal applications, oil and gas, mining, carbon dioxide ($CO_2$) sequestration, and geotechnical and geological engineering applications.

Provided herein are system, apparatus, device, method and/or computer program product embodiments, and/or combinations and sub-combinations thereof, for identifying suitable sites for harvesting geothermal heat and, in some embodiments, visualizing geologic orientation data in geothermal site selection. In some embodiments, the present disclosure provides a seismic display method that directly reveals geologic structure by color, including the 3D orientation of the reflectors in a region of the data volume, and further including dip-domains (e.g., volumes of approximately constant structural dip, such as constant dip of seismic reflectors). The visualization method described herein can sensitively and accurately reveal the 3D orientations of the reflectors because, for example, no color scheme or binning of orientations into colors is imposed on the data. Viewing seismic data with this visualization technique can allow for rapid structural interpretation workflows.

Interpreting geological structures and sedimentary architecture is fundamental to exploration and production of geothermal energy and for other industries such as oil and gas exploration and production, $CO_2$ sequestration, mining, and geological engineering. The embodiments of this disclosure provide techniques that facilitate more accurate and rapid interpretation of geological structures and sedimentary architecture and allow for first-order characterization of geologic orientations in machine-learning applications.

Figure 1:
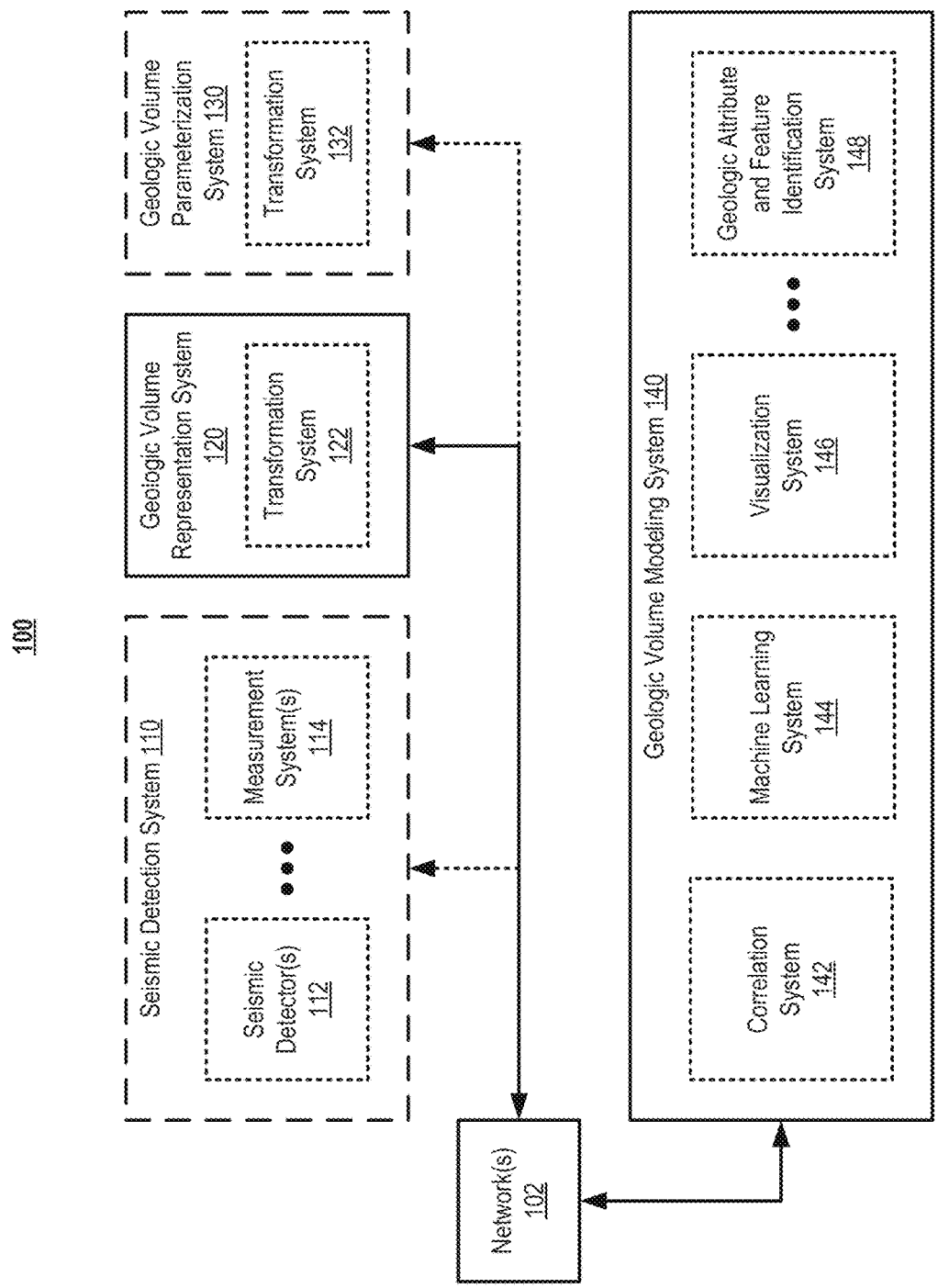
FIG. 1 is a block diagram of an example computing environment, according to some embodiments.

Various embodiments of this disclosure may be implemented using and/or may be part of a computing environment 100 shown in FIG. 1, in some embodiments. It is noted, however, that the computing environment 100 is provided solely for illustrative purposes, and is not limiting. Embodiments of this disclosure may be implemented using and/or may be part of environments different from and/or in addition to the computing environment 100, as will be appreciated by persons skilled in the relevant art(s) based on the teachings contained herein. An example of the computing environment 100 shall now be described.

Definitions

Unless defined otherwise, all technical and scientific terms used herein can have substantially the same meaning as commonly understood by one of ordinary skill in the art to which the disclosure pertains. The following definitions supplement those in the art and are directed to the current application and are not to be imputed to any related or unrelated case, e.g., to any commonly owned patent or application. The terminology used herein is for the purpose of describing particular embodiments only, and is not intended to be limiting.

As used in this specification and the appended claims, the singular forms "a," "an" and "the" include plural referents unless the context clearly dictates otherwise. Thus, for example, reference to "an attribute" includes a plurality of such attributes, and the like.

The term "about" as used herein indicates the value of a given quantity varies by ±10% of the value. For example, a thickness of "about 500 m" encompasses a range of thicknesses from 450 m to 550 m, inclusive.

Spatially relative terms, such as "beneath," "below," "lower," "above," "on," "upper" and the like, may be used herein for ease of description to describe one element or feature's relationship to another element(s) or feature(s) as illustrated in the figures. The spatially relative terms are intended to encompass different orientations of the element(s) or features) in use or operation in addition to the orientation(s) depicted in the figures. The element(s) or feature(s) can be otherwise oriented (e.g., rotated 90 degrees or at other orientations) and the spatially relative descriptors used herein may likewise be interpreted accordingly.

In some embodiments, the term "reflection seismic" refers to seismic data collected by making seismic waves at the earth's surface, such as with a vibrator or explosives, and using multiple sensors on the earth's surface to record the reflected waves. The resulting data are processed to make a two-dimensional (typically vertical) or 3D (e.g., solid) image of the earth's subsurface, analogous to a medical ultrasound image. A 3D reflection seismic volume (e.g., 3D image) is composed of cubic or rectangular boxes termed "voxels" (analogous to pixels in a two-dimensional image). The vertical dimension of the volume is typically either the two-way travel time of the reflected waves or depth in the earth, depending on how the data were processed. The horizontal dimensions are length. The two horizontal rows of the image grid are orthogonal. The grid may be oriented in any direction. One of the horizontal grid orientations is termed the "inline" direction and the rows and vertical planes of voxels defined by each row in that orientation are termed the "inlines." The other direction is termed the "crossline" direction and the rows and vertical planes of voxels defined by each row in that orientation are termed the "crosslines."

In some embodiments, the term "passive seismic" refers to seismic data and images made from that data resulting from recording seismic emissions originating in the subsurface, without an active source or sources at the surface.

The term "natural enhanced geothermal system (NAT-EGS)" refers to a method for harvesting geothermal energy from hot sedimentary aquifers without hydraulic fracturing by generating convection cells between a production well and a reinjection well.

In some embodiments, the term "pole" refers to the line perpendicular to a plane. The pole is a linear representation of the orientation of the plane.

In some embodiments, the term "strike" can refer to the azimuth of a horizontal line drawn on a plane inclined to the horizontal.

In some embodiments, the term "dip-angle" can refer to the maximum vertical angle that can be measured between a plane and the horizontal plane. A line drawn on the plane that descends at the dip-angle is referred to as a "dip-vector," which is perpendicular to the strike.

In some embodiments, the term "dip-azimuth" can refer to the azimuth toward which the dip-vector descends.

In some embodiments, the term "inline-dip" can refer to the vertical angle defined by the intersection of a plane with the vertical plane in the inline direction (e.g., horizontal direction) of the grid of a seismic volume. The inline direction is perpendicular to the crossline direction.

In some embodiments, the term "crossline-dip" can refer to the vertical angle defined the intersection of a plane with the vertical plane in the crossline direction (e.g., horizontal direction) of the grid of a seismic volume. The crossline direction is perpendicular to the inline; direction.

In some embodiments, the term "plunge" or "plunge-angle" can refer to the vertical angle between a line and the horizontal plane.

In some embodiments, the term "trend" or "plunge-azimuth" can refer to the azimuth toward which a line descends or simply the azimuth of the line if the line is horizontal.

In some embodiments, the term "direction-angles" can refer to the angles that correspond to the direction cosines of a line. These are scalar variables that capture first-order structural geology or seismic stratigraphy. Direction-angles can be useful for machine-learning and multivariate statistics applications, such as production-prediction. Direction-angles can be expressed in any angular measurement system including, but not limited to, degrees, grads, and radians. In various embodiments disclosed herein, the angles can be expressed in degrees.

When used to refer to orientation data, the term "axis" refers to a directionless straight line. A two-way street is an analogy. In this document, "coordinate axes" are specified as such to avoid confusion with orientation data.

When used to refer to orientation data, the term "vector" refers to a straight line with direction. Note that when referring to seismic velocities, the term "seismic velocity anisotropy vector" can be used to refer to the orientation of a seismic velocity, which in orientation statistics terms can be an axis because the velocity is the same when propagating in either direction along the line.

In some embodiments, the term "hangingwall" or "hangingwall block" can refer to the rock above a geologic fault.

In some embodiments, the term "footwall" or "footwall block" can refer to the rock below a geologic fault.

The term "attribute" or "geologic attribute" can refer to a property, such as a rock property or a seismically-determined property, that is present at substantially all locations in the geologic volume (e.g., penetrative). The rock property can include density, porosity, permeability, and other suitable rock properties. The seismically-determined property can include velocity, Young's modulus, and other suitable seismically-determined properties.

The term "feature" or "geologic feature" can refer to any discrete, physical feature of rocks in the solid earth, such a fracture, a fault, a fold, an axial plane of a fold, a structural domain, a river channel preserved in sedimentary strata, or myriad other such features. Features have a particular spatial location and dimensions) (e.g., extent), and some types of features may also have an orientation.

The term "structural domain" refers to a spatially-distinct volume of rock wherein the strata or seismic reflectors have a similar orientation that is distinct from such orientations in adjacent rock volumes.

In some embodiments, the term "fold" can refer to a body of rock with originally planar or subplanar surfaces in which the layers were bent (folded).

In some embodiments, the term "fold hinge" or "fold axis" is the line defined by the points of maximum curvature on a folded surface. The term "statistical fold axis" or more loosely simply "fold axis" may also refer to the average orientation of the fold hinges.

In some embodiments, the term "fold axial plane" or "fold axial surface" can refer to the plane or surface defined by the fold hinges. In some aspects, the terms "fold axial plane" and "fold axial surface" can be substantially synonymous because, for example, axial planes are rarely if ever perfectly planar. In some aspects, axial surfaces can be substantially planar. In other aspects, axial surfaces can be, and often are, substantially non-planar, such as curved, wavy, or otherwise irregular. In such aspects where an axial surface has a non-planar axial plane, an average orientation of the axial surface can be used to compute an alternative coordinate axis.

In some embodiments, the term "fracture intensity" can refer to the ratio of fracture surface area to rock volume.

In some embodiments, the term "fracture" or "natural fracture" can refer to any non-sedimentary mechanical discontinuity thought to represent a surface or zone of mechanical failure. Chemical processes such as solution and stress corrosion may have played an important role in the failure process. The term "fracture" can be used to describe a natural feature either when available evidence is inadequate for exact classification or when distinction between fracture types is unimportant. In some embodiments, faults are types of fractures. In some embodiments, an "induced fracture" can refer to any rock fracture produced by human activities, such as drilling, accidental or intentional hydrofracturing, core handling, and other activities.

In some embodiments, the term "fault" can refer to a type of natural rock fracture formed predominantly by sliding and/or or tearing movements. Natural rock fractures that initially formed as joints and were then reactivated as sliding-mode fractures can also be termed "faults" or "faulted joints." Faults can have a wide range of morphologies and fill types and can range from highly permeable to highly impermeable depending on the manner of formation and type of fill. Fault slip-sense and slip-direction can be determined, in some embodiments, from surface features. Fault-type names reflect their slip-sense and slip-direction.

In some embodiments, the term "machine learning" can refer to multivariate-statistics, neural networks, deep neural networks, and other suitable techniques, and any combination thereof. Accordingly, the term "machine learning" as used herein can include all possible correlation methods including multivariate statistics and neural networks.

The term "hot sedimentary aquifer (HSA) can refer to a sedimentary rock stratum or sequence of strata filled with water (e.g., fresh, saline, or brine) that is sufficiently hot and that has sufficient porosity and permeabilty to be an economical source of geothermal energy.

Example Computing Environment

FIG. 1 illustrates a block diagram of a computing environment 100, according to some embodiments. In a non-limiting example, computing environment 100 may be directed to detecting, processing, and analyzing seismic data for a geologic volume. However, this disclosure is applicable to any type of data (instead of or in addition to seismic data), as well as any mechanism, means, protocol, method and/or process for identifying features in the data. In one example, the computing environment 100 may capture first-order structural geology or seismic stratigraphy as scalar variables that can be used for a number of applications, including, but not limited to, geothermal energy. In another example, the computing environment 100 may compute structural seismic attributes which are useful for many different tasks in different industries. The tasks can include, for example, visualization of geological structures, rapid interpretation of geological structures, aiding the performance of orientation statistical characterization of geological structures, predicting localization of natural rock fractures, predicting intensities of natural rock fractures, predicting fluid-flow characteristics of the subsurface (e.g., using the computed structural seismic attributes in conjunction with other types of seismic attributes or petrophysical measurements in wells in machine learning and multivariate statistical analysis), any other suitable task, or any combination thereof. The industries can include, for example, geothermal, oil and gas, $CO_2$ sequestration, engineering geology and geotechnical studies, mining, any other suitable industry, or any combination thereof.

FIG. 1 illustrates a block diagram of an example computing environment 100, according to some embodiments. In some embodiments, the example computing environment 100 can include a seismic detection system 110, a geologic volume representation system 120, a geologic volume parameterization system 130, and a geologic volume modeling system 140, each of which may be configured to communicate via one or more networks 102. In some embodiments, the one or more networks 102 can include, without limitation, wired and/or wireless intranet, extranet, Internet, cellular, Bluetooth, infrared, and/or any other short range, long range, local, regional, global communications mechanism, protocol and/or network, as well as any combination(s) thereof.

In some embodiments, the seismic detection system 110 can include one or more seismic detectors 112 and one or more measurements systems 114, any other suitable system, component, or structure, or any combination thereof. In some embodiments, the one or more seismic detectors 112, the one or more measurements systems 114, or a combination thereof can detect and measure seismic reflections and anisotropy vectors in a geologic volume (e.g., a seismic volume) and generate seismic volume data including 3D seismic data for the geologic volume.

In some embodiments, the geologic volume representation system 120 can include a transformation system 122, any other suitable system, component, or structure, or any combination thereof. In some embodiments, the geologic volume representation system 120 can receive, or retrieve, the seismic volume data from the seismic detection system 110 or a geologic database coupled thereto.

In some embodiments, the geologic volume representation system 120 can generate, based on the seismic volume data, dip-angle and dip-azimuth volume data (e.g., a dip-angle/dip-azimuth volume) including a set of dip-angles and a set of dip-azimuths according to a set of measurement conventions indicative of a set of planar orientations in 3D seismic data for a geologic volume.

In some aspects, the written numbers that define each 3D orientation are dependent on the measurement convention used to write the numbers. Accordingly, the same orientation can be written differently depending on the measurement convention used to define that orientation. In one illustrative and non-limiting example, a 3D orientation for a plane that is inclined 45° due northeast can be written as: (i) dip-angle/dip-azimuth: 45°/045°; (ii) right-hand-rule dip-angle/strike: 45°/315°, (iii) dip-angle/strike dip-quadrant: either 45°/315° NE or 45°/135°NE; and so forth, each of which defines the same 3D orientation. In some aspects, if the 3D orientation was a dip computed from a seismic volume, and the 3D orientation was expressed as inline-dip and crossline-dip, then the 3D orientations of the vertical inline and crossline planes and the dip-direction of the line (e.g., which way the line was descending) would also be provided. In some aspects, direction-angles can be another measurement convention that, in contrast to these conventions, does not require module 360° arithmetic or complex rules to define a 3D orientation. As a result, the direction-angle image shown in FIGS. 5A and 5B can be obtained by rewriting the 3D orientations as direction-angles to avoid overly complex, cumbersome, and resource intensive algorithms requiring module 360° arithmetic and complex rules.

In some embodiments, the geologic volume representation system 120 can generate, based on the seismic volume data, inline dip-angle and crossline dip-angle volume data (e.g., an inline-dip/crossline-dip volume) including a set of inline dip-angles and a set of crossline dip-angles according to a set of measurement conventions indicative of a set of planar orientations in 3D seismic data for a geologic volume. In some embodiments, each data pair can be a measurement of the planar orientation of a seismic reflector, and the dip-angles and dip-azimuths, as well as the inline-dip and crossline-dip, can be structural seismic attributes. In alternative embodiments, the geologic volume representation system 120 can generate linear orientations expressed as plunge and trend.

In some embodiments, the geologic volume representation system 120 can generate a set of direction-angles (e.g., a set of three direction-angles) of the pole to the planar orientations based on the dip-angle and dip-azimuth volume data, the inline dip-angle and crossline dip-angle volume data, or to the linear orientations expressed as plunge and trend. For example, the geologic volume representation system 120 can utilize the transformation system 122 to convert the dip-angle/dip-azimuth volume, or the inline-dip/crossline-dip volume, to a set of direction-angles of the pole to the planar orientation.

In some embodiments, the geologic volume representation system 120 can generate the set of 3D orientations of a set of seismic reflectors as direction-angles of the pole to the planar orientations or convert dip-angle/dip-azimuth, inline-dip/crossline-dip or other orientation volumes into direction-angles of the pole to the planar surface.

In some embodiments, the direction-angles can be utilized as a technique to express the 3D orientations of the seismic reflectors. For example, the seismic reflectors can have a 3D orientation, and a dip-angle/dip-azimuth volume or inline-dip/crossline-dip volume can provide a set of measurements of those orientations. In another example, in a dip-angle/dip-azimuth or inline-dip/crossline-dip volume, the values at each voxel (e.g., a sample, value, or data point in a regularly-spaced, 3D grid) can be measurements of the orientations of the seismic reflectors. Direction-angles can be another, more useful, way to express these orientation measurements. Accordingly, the dip-angle/clip-azimuth, inline-dip/crossline-dip, and direction-angle volumes can all be sets of measurements of the 3D orientations of seismic reflectors in the seismic volume.

In some embodiments, the transformation system 122 can compute the 3D orientations of axial planes and fold axes from the direction-angles or the dip-angle/dip-azimuth or inline-dip/crossline-dip volumes using orientation-statistics methods. To perform the computation, the transformation system 122 can extract the orientation data for the region of interest from the complete seismic volume, such as by using a user-defined or automatically-defined 3D geobody in a seismic interpretation subroutine.

In some embodiments, the set of direction-angles are measured relative to a coordinate system (e.g., a set of three orthogonal coordinate axes). The coordinate system can be, for example: a North, East, and Down coordinate system; a North, East, and two-way travel time coordinate system; an inline, crossline, and depth coordinate system; an inline, crossline, and two-way travel time coordinate system; a local coordinate system defined by a geometry of a volume of folded rocks in the 3D seismic data; a coordinate system having non-orthogonal axes; a conformally-mapped coordinate system; a complex, mathematically transformed coordinate system; any other suitable coordinate system; or any combination thereof.

In some embodiments, the transformation system 122 can transform the 3D orientations to generate a set of transformed 3D orientations based on one or more mathematical transformation operations. For example, the transformation system 122 can transform the seismic volume data into the direction-angle format for the benefit of a computerized representation of the data. In another example, the transformation system 122 can transform the 3D orientations by recomputing them relative to a different set of coordinate axes defined by the geologic structure in the volume. In such embodiments, the recomputed (e.g., rotated) set of coordinate axes has a first coordinate axis parallel to the fold axis, a second coordinate axis perpendicular to the fold axial plane (which is orthogonal to the fold axis), and a third axis orthogonal to the first two axes.

In some embodiments, the geologic volume representation system 120 can generate a set of scalar values (e.g., direction-angles) based on the rotated set of coordinate axes. For example, the geologic volume representation system 120 can compute, or recompute, the direction-angles relative to any set of coordinate axes in any orientation, including a rotated set of coordinate axes. In some embodiments, an alternative orientation for the coordinate axes can have one axis parallel to the fold hinge and one axis perpendicular to the fold axial plane. For example, the rotated set of coordinate axes can be a set of three mutually orthogonal axes such that one axis is parallel to a fold hinge (or a statistically determined average fold hinge) and the second is perpendicular to a fold axial plane (or a statistically determined fold axial plane).

In some embodiments, the geologic volume parameterization system 130 can include a transformation system 132, any other suitable system, component, or structure, or any combination thereof. In some embodiments, the geologic volume parameterization system 130 can generate, or retrieve from a geologic database, a set of parameters (e.g., scalar values) associated with a measurement of a property of the geologic volume. The set of parameters can include, for example:

Seismic attributes such as, but not limited to, reflection amplitude, mechanical properties (e.g., Young's modulus, Poisson's ratio), seismic velocities, and seismic velocity anisotropy.

Rock properties measured in wellbores such as, but not limited to, porosity determined from neutron or gamma ray tools, natural gamma ray emissivity at different wavelengths, electrical resistivity at different distances from the wellbore, density, sonic velocity, sonic anisotropy, temperature, photoelectric effect, rock or fracture permeability from Stonely wave data or direct measurements with a downhole formation tester, direct measurements of formation fluid pressure, chemical data from in-situ neutron-activation analysis tools, and mineralogy, porosity, fluid type and/or fluid saturations computed from other data types.

Engineering data such as, but not limited to, the locations, orientations, lengths, and/or productivity of production wells such as extraction well 220.

Geological data such as, but not limited to, distance from faults.

Geophysical data such as, but not limited to, rock magnetism and electrical resistivity.

In some embodiments, the geologic volume modeling system 140 can include a correlation system 142, a machine learning system 144, a visualization system 146, a geologic attribute and feature identification system 148, any other suitable system, component, or structure, or any combination thereof.

In some embodiments, the geologic volume modeling system 140 can receive (e.g., from the geologic volume representation system 120) a discrete 3D representation of a geologic volume in any format including a set of 3D orientations (e.g., direction-angles, dip-angle/dip-azimuth, etc.) of, for example, a set of seismic reflectors, seismic velocity anisotropy vectors, or other 3D orientation attributes of reflection seismic volumes in the geologic volume. In some embodiments, the set of 3D orientations can be written as a set of direction-angles. In some embodiments, the set of direction-angles can be a set of scalar variables that are measured relative to a set of coordinate axes, assigned to a set of channels (e.g., color channels), and vary linearly with orientation. In some embodiments, each direction-angle in the set of direction-angles can be assigned to a respective channel of the set of channels such that each channel holds only direction-angles with respect to a single coordinate axis (e.g., one channel holds only direction-angles relative to North, another relative to East, another relative to Down). For example, each direction-angle in the set of direction-angles can be assigned to a respective red, green, or blue channel in a red-green-blue color scheme, as described in further detail below with reference to FIGS. 5A, and 5B. In some embodiments, each 3D orientation in the set of 3D orientations can be represented as a set of direction cosines corresponding to a set of direction-angles assigned to a set of channels. In other embodiments, each 3D orientation in the set of 3D orientations can be represented in more complex ways, such as by having a non-linear relationship between color channel response and direction-angle magnitude. In some embodiments, each direction-angle in the set of direction-angles can be a scalar value. In some embodiments, for visualization (e.g., to generate a direction-angle image), each direction-angle in the set of direction-angles can be assigned to a respective channel in the set of channels. In some embodiments, each direction-angle in the set of direction-angles can correspond to a coordinate system defined by a geometry of a volume of folded rocks in the geologic volume.

In some embodiments, the discrete 3D representation of the geologic volume can be a volume of 3D planar or linear orientations expressed in any manner, such as a dip-angle and dip-azimuth volume, an inline-dip and crossline-dip volume, a direction-angle volume, or any other volume of angles, scalar variables, and/or measurement conventions in any combination that can be used to express a 3D orientation. In some embodiments, the techniques described herein can be useful for working with linear orientation data (e.g., seismic velocity anisotropy vectors) as well as planar orientation data (e.g., the orientations of seismic reflectors). In one example, the machine learning system 144 can utilize seismic velocity anisotropy vectors in machine learning and/or multivariate statistical applications in substantially the same way as seismic reflector orientations. In some embodiments, the set of 3D orientations can be a set of transformed 3D orientations. For example, the set of transformed 3D orientations can be a set of rotated 3D orientations.

In some embodiments, the geologic volume modeling system 140 can receive (e.g., from the geologic volume parameterization system 130) a set of parameters (e.g., scalar values) associated with another measurement of a property of the geologic volume. The set of parameters can include, for example, those listed above with reference to the geologic volume parameterization system 130.

In some embodiments, the correlation system 142 can correlate the set of 3D orientations with the set of parameters to generate a geologic correlation data structure. The term "geologic correlation data structure" can refer to structured data resulting from a correlation operation performed on geologic data.

In some embodiments, the geologic attribute and feature identification system 148 can identify geologic attributes and geologic features, associated with the geologic volume based on the geologic correlation data structure. For example, the geologic attribute and feature identification system 148 can perform spatial analysis of the 3D orientations using orientation statistics or other methods to identify (for example) any fold axes, fold axial planes, structural domains, faults, and/or sedimentary or seismic stratigraphic features in the geologic volume. The geologic attribute & feature identification system can use the identified geologic features to generate geologic attributes such as distance from faults or association with a structural domain. In some aspects, these geologic attributes can be used for machine learning.

In some embodiments, the geologic attribute and feature identification system 148 can identify structural features (e.g., folds, faults, axial planes, structural domains) or sedimentary or seismic-stratigraphic features (e.g., unconformities, flooding surfaces, sequences, parasequences), with or without correlation between data sets. Additionally or alternatively, the geologic attribute and feature identification system 148 may use orientation data alone to make such identifications.

In some embodiments, the geologic attributes can include one or more properties (e.g., porosity, permeability, fracture intensity) which are present at substantially all locations in the geologic volume. In some embodiments, the geologic features can include one or more discrete features having particular spatial locations, extent, and orientation. In one example, at least one direction-angle in the set of direction-angles can be indicative of, and the identified geologic attributes can include, one or more structural seismic attributes indicative of indicative of one or more structural features (e.g. folds, faults, axial planes, structural domains), sedimentary features, stratigraphic features, and/or seismic-stratigraphic features (e.g. unconformities, flooding surfaces, sequences, parasequences) in the geologic volume. In some embodiments, key attributes that indicate structural and sedimentological features can be direction-angles and reflection amplitudes.

In some embodiments, the geologic attribute and feature identification system 148 can determine fold axes and axial planes as average values by performing orientation statistics on a volume of data (e.g., a spatially-distinct subvolume of an entire data volume, such as a subvolume of a 3D seismic survey) that is substantially statistically homogeneous. The term "statistically homogeneous" means that the statistics of arbitrarily-defined subvolumes are similar to the statistics of the entire volume.

In some embodiments, the geologic attribute and feature identification system 148 can identify structural domains likely to be fractured, and, in some aspects, estimate fracture intensity (e.g., fracture area/rock volume), since fracture intensity can correlate with structural orientation (e.g., even gentle folding can cause fracturing).

In some embodiments, in addition to identifying geologic features and geologic attributes, the geologic attribute and feature identification system 148 can identify non-geological characteristics associated with the geologic volume based on the geologic correlation data structure. The non-geological characteristics can include, but are not limited to, engineering parameters such as drilling-direction and wellbore-length. In some embodiments, such engineering parameters can be incorporated into machine-learning schemes to predict optimum drilling-direction and wellbore-length.

Figure 5A:
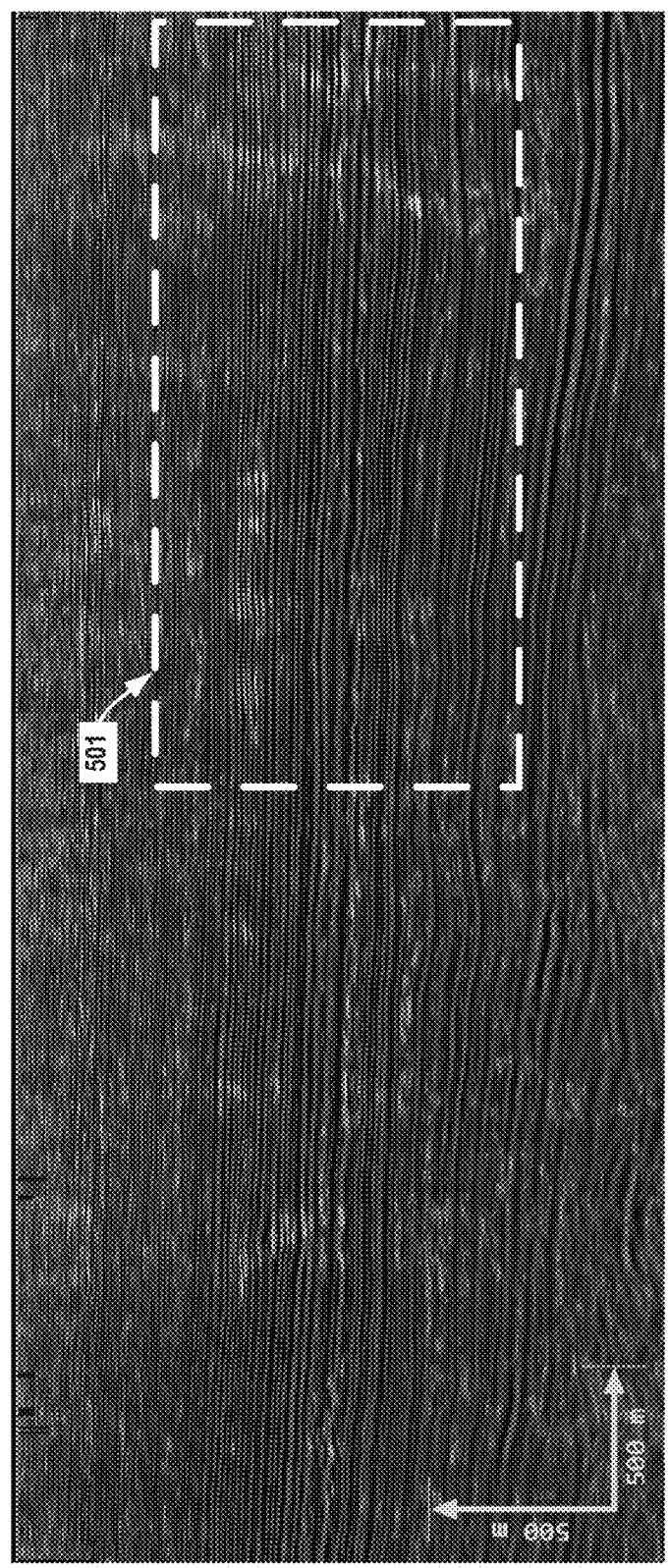
FIGS. 5A and 5B are vertical slices of an example solid 3D direction-angle image, according to some embodiments.
Figure 5B:
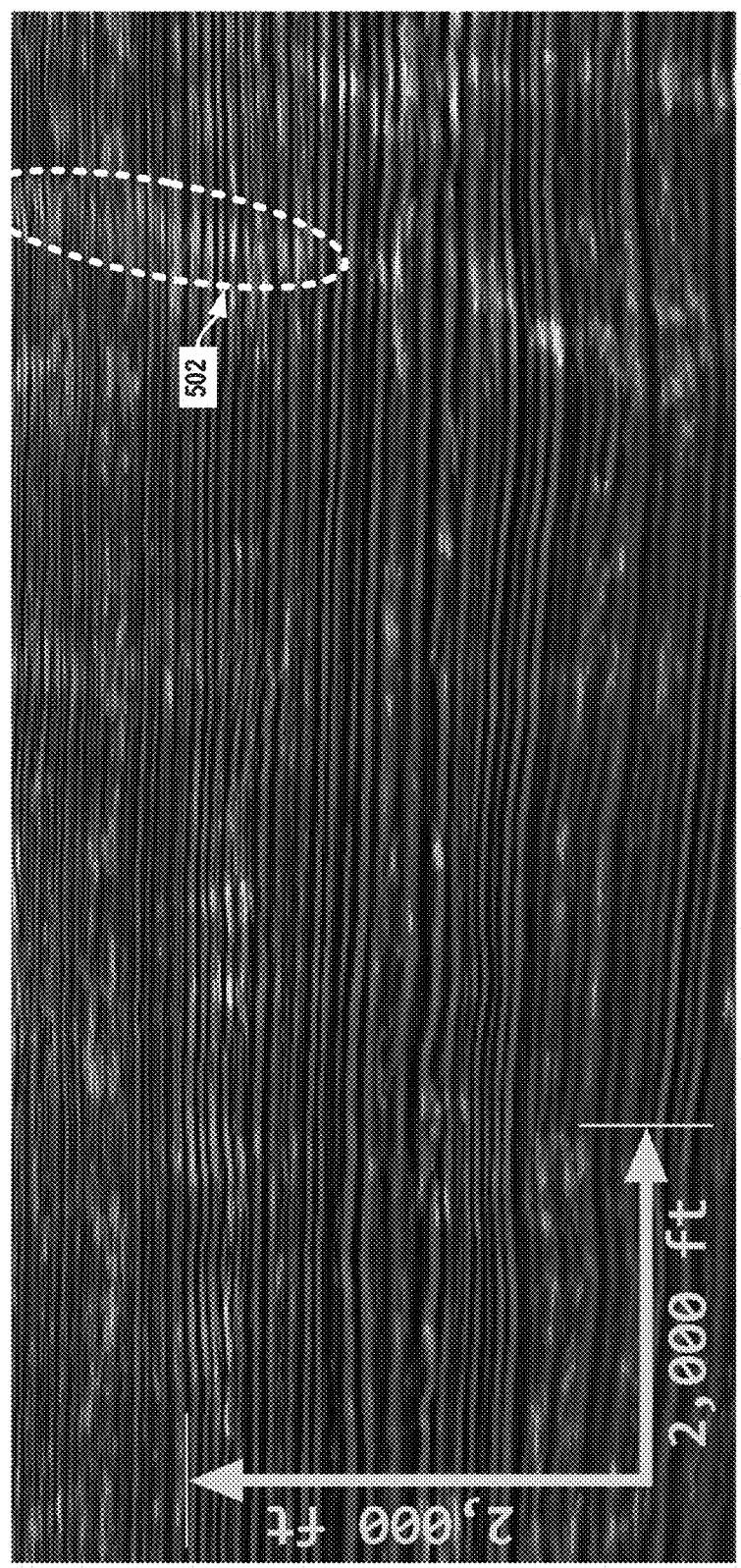

In some embodiments, the visualization system 146 can generate a direction-angle image indicative of the discrete 3D representation of the geologic volume (e.g., in grayscale) and the set of geologic attributes and/or geologic features associated with the geologic volume (e.g., in color). For example, the visualization system 146 can assign each direction-angle in the set of direction-angles to a color channel in the set of channels to provide for false-color visualization. In some embodiments, the geologic attribute and feature identification system 148 can use the visualization system 146 to identify and draw faults and axial planes by marking the color changes when the direction-angles are used as color channels (e.g., as shown in FIGS. 5A and 5B).

In some embodiments, the machine learning system 144 can utilize machine learning to compute a probability that each direction-angle (or the set of direction-angles as a whole) corresponds to particular feature, such as a structural domain, HSA, or other suitable feature. In some embodiments, machine learning identification of an HSA may use multiple data types to make the identification, in addition to direction-angles. As an HSA is a rock layer, direction-angles are useful for identifying parts of the rock volume that have different fracture intensities and hence different fluid-flow properties. For example, with reference to FIG. 3, if sub-surface layer 310A-310B is an HSA, in the fold limb (between the active axial plane 330 and the inactive axial plane 340) the HSA will have many fractures and hence will have a higher bulk (e.g., matrix+fracture) permeability but might have undesirable flow characteristics caused by the fractures. The HSA may be drilled in a particular structural domain to take advantage of the fracture permeability, or that structural domain may be avoided because fractures could channel the fluid flow and thus limit access to the heat stored in the entire rock volume.

In some embodiments, the machine learning system 144 can classify the set of direction-angles (e.g., a set of the North, East, Down angles for each voxel) using a direction-angle classifier machine learning model. For example, the machine learning system 144 can classify the sets of direction-angles as belonging to a structural domain or a set of structural domains.

In some embodiments, the direction-angle classifier machine learning model may have been trained by, for example, a training process that includes: (i) generating, for each direction-angle in the set of direction-angles, a respective probability value (a) that the respective direction-angle corresponds to a desired rock property, including, but not limited to, a property of an HSA such as a threshold permeability value, a threshold porosity value, a threshold temperature value, a threshold fracture intensity value, any other value of interest, or any combination thereof, or (b) that a group of properties including direction-angles corresponds to a specific property. The training process can further include (ii) modifying, based on the respective probability value generated for the respective direction-angle, each direction-angle in the set of direction-angles to generate a set of modified direction-angles. The training process can further include (iii) generating the set of classified direction-angles (e.g., direction-angles that have been classified by the machine learning system 144) based on the set of modified direction-angles.

An example process for modifying a set of direction-angles to make a set of classified direction-angles can include: (1) averaging a subvolume of the geologic volume, such as a structural domain (e.g., like those visible in FIGS. 5A and 5B); (2) substituting the average 3D orientations for the original 3D orientations in the subvolume to make a classified set of 3D orientations; (3) repeating this process to turn a geologic volume such as the one depicted in FIGS. 5A and 5B into an averaged geologic volume resembling the example geologic volume 300 shown in FIG. 3; (4) classifying (e.g., as described in (iii) above) the 3D orientations in the averaged geologic volume as belonging to specific parts of a fold (e.g., as shown in in FIG. 3). For example, 3D orientations belonging to the structural domain between two axial planes (e.g., the active axial plane 330 and the inactive axial plane 340) could be classified as a folded limb or a specific type of fold limb.

In some embodiments, as described above, the machine learning system 144 can generate a set of classified 3D orientations based on the set of classified direction-angles. In some embodiments, as described above, the machine learning system 144 can generate a classified discrete 3D representation of the geologic volume (e.g., for automatically identifying structural features such as structural domains) based on the set of classified 3D orientations.

In some embodiments, the correlation system 142 can correlate the set of classified 3D orientations with the set of parameters to generate a classified geologic correlation data structure. In some embodiments, the geologic attribute and feature identification system 148 then can identify the geologic attributes and/or geologic features associated with the geologic volume based on the classified geologic correlation data structure. In some embodiments, the visualization system 146 can generate a classified direction-angle image indicative of the classified discrete 3D representation of the geologic volume and the identified geologic attributes and/or geologic features associated with the geologic volume. In some embodiments, the classified direction-angle image can resemble the drawing shown in FIG. 3, whereas the unclassified direction-angle image can resemble the one shown in FIG. 5.

Figure 2:
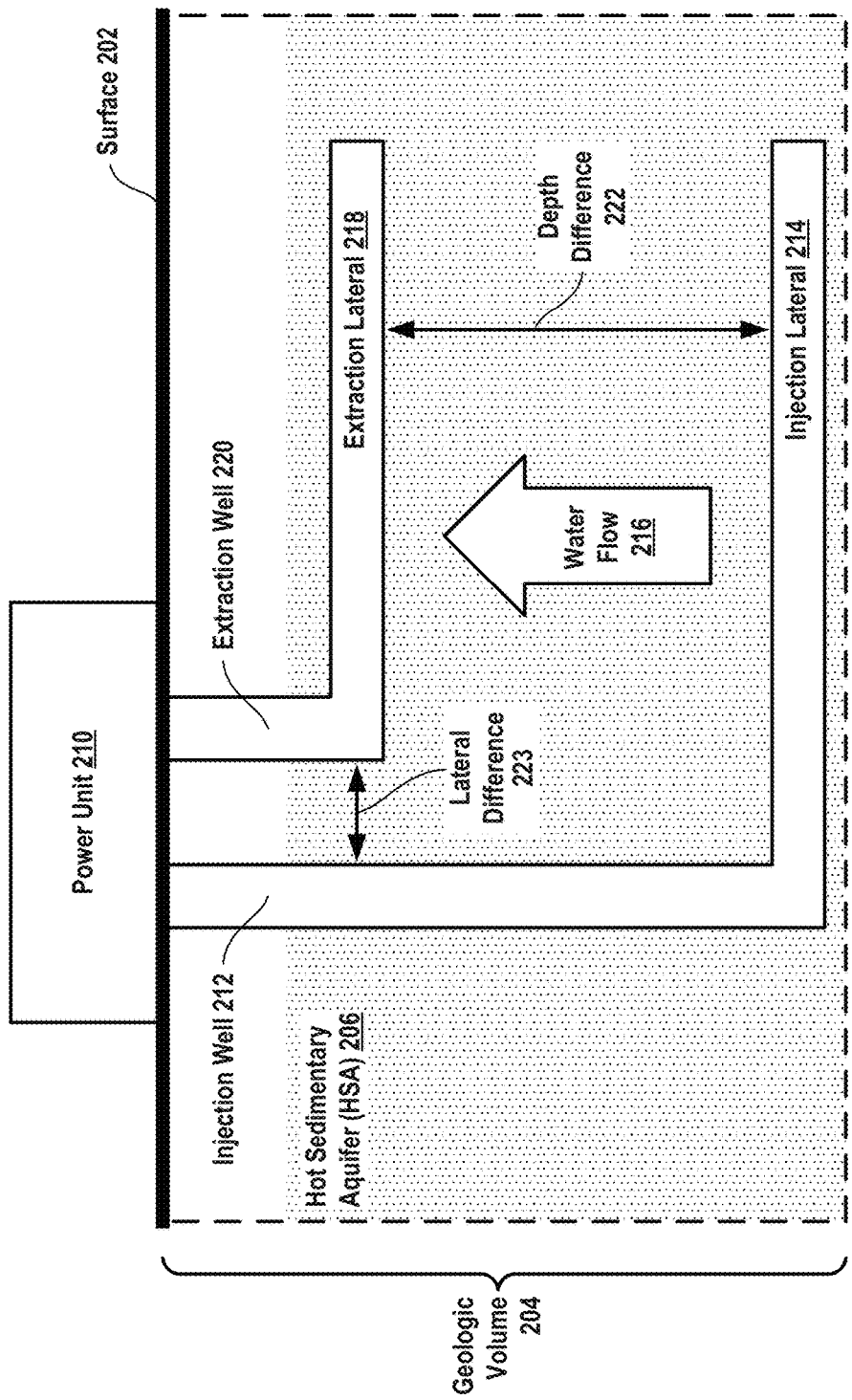
FIG. 2 is a schematic diagram of an example natural geothermal system, according to some embodiments.

FIG. 2 is a diagram of an example implementation of an example natural geothermal system 200, according to some embodiments. In some embodiments, natural geothermal system 200 may be a NAT-EGS. In some embodiments, one or more of the operations described below with reference to FIG. 2 may be performed or otherwise carried out by one or more components of the computing environment 100, the computer system 700, or a combination thereof.

As shown in FIG. 2, a power unit 210 (e.g., a power plant or other type of geothermal energy processing or utilization facility) associated with the natural geothermal system 200 is positioned on a surface 202 of a location that is above, over, or near a geologic volume 204 that includes an HSA 206. The natural geothermal system 200 includes an extraction well 220 with an extraction lateral 218 and an injection well 212 with an injection lateral 214 that have been drilled to various depths of the HSA 206 and that are either vertically aligned or horizontally separated.

In some embodiments, the power unit 210 may include a pump system, an energy capture unit, an energy conversion unit (e.g., to convert geothermal energy to mechanical energy, electrical energy, any other suitable form of energy, or any combination thereof), and a regulatory device to control the natural geothermal system 200. For example, the regulatory device may control an extraction pump of the pump system to extract water from the I-ISA 206 via the extraction well 220, In another example, the regulatory device may control the energy capture unit, the energy conversion unit, or both to capture and process geothermal energy from the heated water, resulting in cooled water. In still another example, the regulatory device may control the injection pump to inject the cooled water from the energy capture unit into the EISA 206 via the injection well 212. In some embodiments, the power unit 210 may be configured based on a determined optimum range of water injection rate in the injection well 212 and/or water extraction rate of the extraction well 220 that can produce commercial levels of energy or power. Further, the flow rate of the water (e.g., as indicated by water flow 216) can be tuned (e.g., over time) via pumping adjustments to achieve a best possible efficiency for the natural geothermal system 200 according to the conditions of the HSA 206.

Regarding the terrain of the natural geothermal system 200 (e.g., as indicated by geologic volume 204), the surface 202 may correspond to a ground or soil surface, a water surface (e.g., a lake surface, ocean surface, river surface), or any other suitable type of surface of the Earth. The HSA 206 can be disposed beneath the surface 202 (e.g., beneath the power unit 210) and may include any suitable type of fresh or salt-water bearing sedimentary rock. In some embodiments, the HSA 206 may be configured above and/or between one or more layers of igneous rock.

In some embodiments, the location of the surface 202 may be selected for the power unit 210 based on one or more geothermal characteristics of the HSA 206. For example, the location of the surface 202 may be selected based on determining that the EISA 206 is at a suitable, manageable, and/or accessible depth and includes a sufficient volume of water at a sufficiently high temperature, to determine whether the HSA 206 can efficiently be used to capture geothermal energy from the Earth. The HSA 206 (and/or geothermal characteristics of the I-ISA 206) may initially be identified and/or analyzed from drilling and sampling the terrain beneath the surface 202. Additionally or alternatively, the HSA 206 may be identified and/or analyzed from seismic imaging data (e.g., mapping data, imaging data, the parameters listed above with reference to the geologic volume parameterization system 130) associated with the terrain beneath the surface 202. The seismic imaging data may be obtained and/or captured in real-time and/or may correspond to historical data associated with previous seismic imaging and/or previously created well bores associated with previous operations, analyses, and/or geological mappings of the terrain beneath the surface 202.

In some embodiments, the geothermal characteristic of the HSA 206 may correspond to one or more characteristics of the HSA 206 that would enable a desired amount of geothermal energy to be extracted from the Earth at a particular rate, for a particular period of time, or both. Such geothermal characteristics may be based on certain physical characteristics of the HSA 206 (e.g., depth, thickness, porosity, permeability, temperature of the HSA 206, and/or pressure and/or composition of water within the HSA 206).

In some implementations, one of the geothermal characteristics of the HSA 206 that may be considered when selecting the location of the surface 202 for the power unit 210, may include a measured or determined heat flow between various depths of the HSA 206. The heat flow may indicate and/or represent an amount of heat or geothermal energy that can be captured from the RSA 206 during a particular time period. The heat flow may be based on the depths (e.g., uppermost, lowermost) of the HSA 206 (e.g., due to the geothermal gradient), the temperature of the water at various depths of the HSA 206 (e.g., which may depend on various factors, such as the terrain or type of material of the HSA 206), any other suitable characteristic, or any combination thereof. Accordingly, the heat flow can be determined (e.g., estimated) based on certain characteristics and/or measurements associated with the HSA 206.

Another geothermal characteristic may include permeability of the HSA 206. The permeability of the HSA 206 may indicate the rate at which water can be extracted from the HSA 206. Correspondingly, in combination with temperatures of the HSA 206 (e.g., at various depths of the HSA 206), the amount of heat or geothermal energy that can be extracted from the HSA 206 can be determined. The permeability of the HSA 206 may be determined based on various standard pumping tests conducted in the associated drill holes into the HSA 206 and, in some embodiments, further based on the terrain of the HSA 206. According to some implementations, a construction lateral can be drilled between the injection lateral 214 and the extraction lateral 218 to perform an operation to improve the permeability of the HSA 206. For example, such a construction lateral may be drilled and configured to receive a fuel (e.g., a liquid or solid fuel that gets ignited), acidic water, and/or pressurized water to increase the bulk permeability of the HSA 206, thereby improving the permeability between the injection lateral 214 and the extraction lateral 218. In such cases, the permeability of the RSA 206 may satisfy a permeability threshold associated with permitting the construction lateral to be drilled. In some embodiments, such a threshold permeability may be greater than a permeability threshold to use the HSA 206 without performing enhancement operation to increase the permeability of the HSA 206 to configure the natural geothermal system 200.

Similar to permeability, the geothermal characteristic may include or be associated with a porosity of the HSA 206, which can indicate of the volume of water held by the HSA 206. The porosity may indicate or be used to identify the permeability and enable a determination of a flow rate of water through the HSA 206, an amount of water that can be received within the HSA 206 after being processed by the power unit 210 (e.g., to determine an injection rate of a flow of water via the injection well 212).

Such geothermal characteristics may be compared against corresponding thresholds of the geothermal characteristics to determine whether the HSA 206 is suitable for capturing a desired amount of geothermal energy (e.g., corresponding to enough energy to permit the power unit 210 to output a desired amount of power for an area or region of the location of the surface 202) for a desired period of time (e.g., over 50 years). In some embodiments, the thresholds may include a minimum heat flow rate into the HSA 206, a minimum permeability of the HSA 206, a minimum porosity of the HSA 206, any other suitable threshold, or any combination thereof. Additionally or alternatively, certain physical characteristics of the HSA 206 associated with geothermal characteristics of the HSA 206 may be considered (e.g., a minimum or maximum depth of the HSA 206, a minimum or maximum thickness of the HSA 206, a minimum temperature of the HSA 206).

In some embodiments, the natural geothermal system 200 may utilize the HSA 206 that has a sufficiently high background basal heat flux and is sufficiently large enough (e.g., has a sufficient volume, thickness) to supply geothermal energy for fifty years or more. In some locations of the Earth, such an injection depth of the HSA 206 may be at a minimum of 2500 in below the surface 202, and/or such an extraction depth of the HSA 206 may be at a minimum of 2000 m. In such an example, any recirculated water that was injected via the injection well 212 and is extracted via the extraction well 220 reaches the threshold temperature of at least 220° C. For higher levels of basal heat flux, the minimum depth becomes correspondingly less.

In some embodiments, after the location of the surface 202 is selected for the power unit 210, the natural geothermal system 200 may be configured and/or designed according to the characteristics of the HSA 206. For example, as shown, the injection well 212 and the extraction well 220 are a disjointed well system in that heated water is to be extracted from the HSA 206 at an extraction depth and cooled water (which is created from capturing heat from the heated water) is to be injected at an injection depth of the HSA 206, In some embodiments, based on the geothermal characteristics of the HSA 206 and the desired amount of geothermal energy that is to be captured from the HSA 206, the extraction depth and injection depth (and, correspondingly, the depth difference 222 between the extraction depth of the extraction lateral 218 and the injection depth of the injection lateral 214), as well as the extraction location and the injection location (and, correspondingly, the lateral difference 223 between the extraction well 220 and the injection well 212), can be determined to provide a desired water flow rate and/or energy extraction rate for a desired period of time that the power unit 210 is to be operable to provide power. As a result, the extraction well 220 and the injection well 212 may be offset laterally, vertically, or both laterally and vertically.

In some implementations, the cooled water can be supplied with a supplemental fluid (e.g., a solvent or solute, such as a muriatic acid, hydrochloric acid) to facilitate flow of available water through the HSA 206, as indicated by water flow 216. For example, the supplemental fluid, when injected into the HSA 206 via the injection well 212 (along with the cooled water) can increase permeability and/or porosity of the HSA 206 (by causing erosion or breakdown of some of the rock or material of the HSA 206). In this way, the natural geothermal system 200, using the supplemental fluid, can improve geothermal energy extraction via the HSA 206.

In some embodiments, geothermal energy can be obtained, by the power unit 210 and from the HSA 206, by pumping heated water from the HSA 206 via the extraction well 220, extracting heat from the heated water to capture energy, resulting in cooled water, and injecting the cooled water back into the HSA 206 via the injection well 212.

Figure 3:
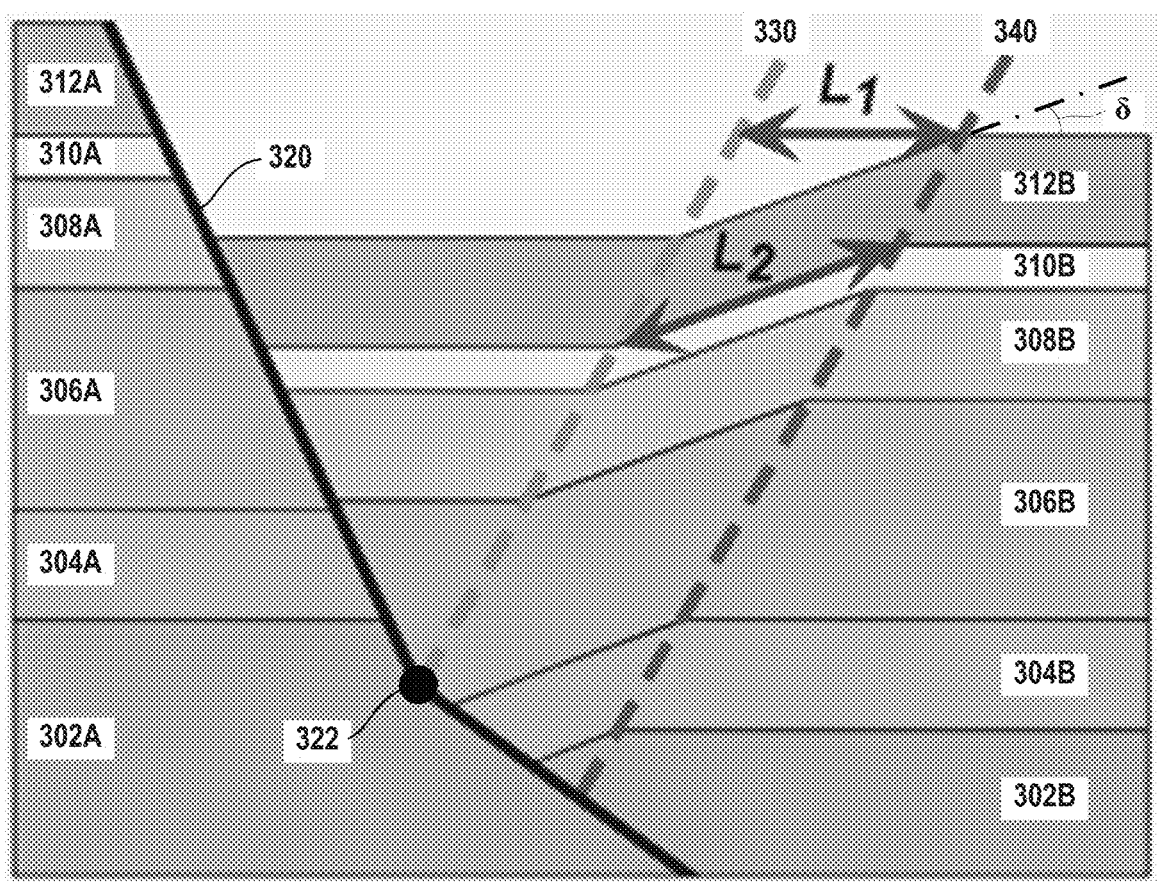
FIG. 3 is a schematic diagram of an example geologic volume, according to some embodiments.

FIG. 3 is a schematic diagram of an example geologic volume 300, according to some embodiments. For example, the example geologic volume 300 illustrates how layers of rock can be deformed in an extensional fault-bend fold and how the change of layer orientation marks the fault 320, the fault bend 322, the active axial plane 330, and the inactive axial plane 340. In some embodiments, one or more of the operations described below with reference to FIG. 3 may be performed or otherwise carried out by one or more components of the computing environment 100, the computer system 700, or a combination thereof.

As shown in FIG. 3, the example geologic volume 300 can include a plurality of sedimentary layers (e.g., rocks, permeable beds, impermeable beds, and other such geologic layers) disposed at or below the Earth's surface, such as a subsurface layer 302A-302B, a subsurface layer 304A-304B, a subsurface layer 306A-306B, a subsurface layer 308A-308B, a subsurface layer 310A-310B, and a subsurface layer 312A-312B. In some embodiments, the subsurface layer 302A may be referred to as being in the footwall or footwall block, and the subsurface layer 312B may be referred to as being in the hangingwall or hangingwall block. In some embodiments, the example geologic volume 300 can further include a plurality of other structures, such as reservoirs, aquifers, HSAs, water, gases, oils, coals, wells, and other such features.

In some embodiments, the example geologic volume 300 can include a fault 320 having one or more bends or changes in orientation, such as a fault bend 322, and one or more axial planes, such as an active axial plane 330 and an inactive axial plane 340. For example, the fault 320 can have a flattening bend prior to the development of identifiable displacement along the fault.

In some embodiments, as the hangingwall block moves (e.g., downwards and to the right as shown in FIG. 3), a void can open if the rocks of the hangingwall block are sufficiently strong. Otherwise, the sedimentary layers may deform to fill the void as the hangingwall block moves past the fault bend 322. The inactive axial plane 340 moves with the hangingwall block, and the active axial plane 330 is pinned to the fault bend 322 and remains stationary relative to the footwall block. In some embodiments, the sedimentary layers can fold continuously as they move through the active axial plane 330. For example, the sedimentary layers rocks can fold by one or more of any possible deformation mechanism, including grain sliding and minor faulting.

In some embodiments, folding can require extensional strain. In some embodiments, the extensional strain can be computed from seismic data. For example, a stratigraphic length $L_1$ must extend to a length $L_2$ in the folded panel. The extensional strain can be determined as shown in equations 1 and 2 below:

$$\text{Extensional Strain} = \frac{L_2 - L_1}{L_1} \quad (1)$$

$$L_1 = L_2 \cos \delta \quad (2)$$

In equation 2 above, the term "$\delta$" represents the dip of bedding in the rollover (the structural domain between the two axial planes where the layering dips to the left) measured relative to the dip of undeformed bedding in the subsurface layer 312B.

In some embodiments, the magnitude of the extensional strain can be a predictor of fracture strain. For example, if folding-related strain is accommodated by brittle fracturing, then the systems and components described herein can predict where fractures are developed using structural models.

Figure 4:
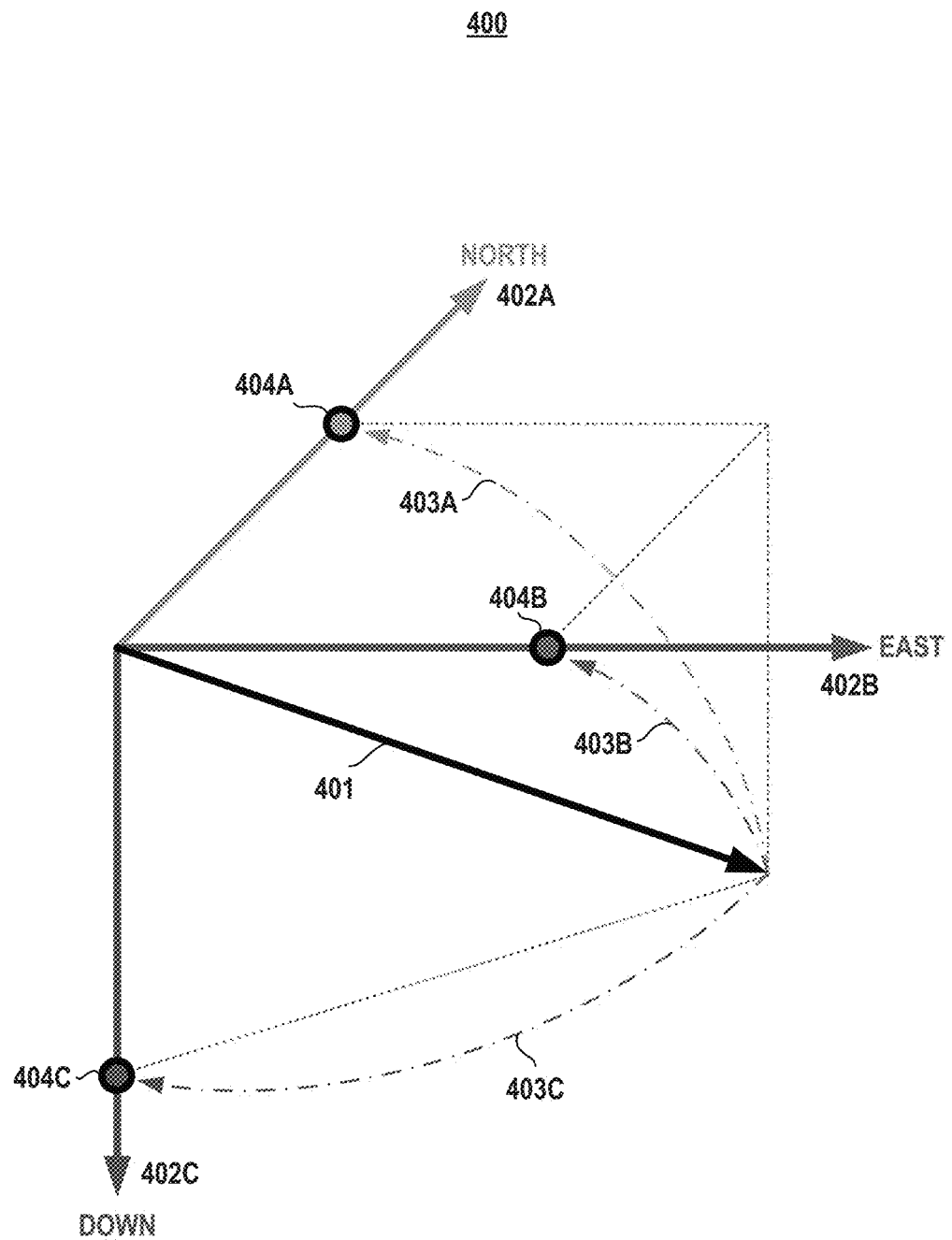
FIG. 4 is an illustration of an example three-dimensional (3D) orientation, according to some embodiments.

FIG. 4 shows an example 3D orientation 400 that can be included in a set of 3D orientations in a geologic volume, according to some embodiments. In some embodiments, one or more of the operations described below with reference to FIG. 4 may be performed or otherwise carried out by one or more components of the computing environment 100, the computer system 700, or a combination thereof.

As shown in FIG. 4, the example 3D orientation is represented by a unit vector 401 which can be represented as a set of direction cosines 404A-404C. The set of direction cosines 404A-404C are scalar values that represent the direction cosines along a set of coordinate axes 402A-402C. The direction cosines correspond to a set of direction-angles 403A-403C assigned to a set of channels (e.g., color channels). The set of direction-angles 403A-403C are scalar values that represent the angles that correspond to the direction cosines of the unit vector 401, measured relative to the set of coordinate axes 402A-402C.

In some embodiments, the set of direction-angles 403A-403C can correspond to a coordinate system selected from a group of coordinate systems consisting of: an East, North, and Down coordinate system (as shown in FIG. 4); an inline, crossline, and depth coordinate system; an inline, crossline, and time coordinate system; a local coordinate system defined by a geometry of a set of folded rocks in the 3D seismic data; any other suitable coordinate system; or any combination thereof. In some embodiments, each direction-angle in the set of direction-angles 403A-403C can be assigned to a respective channel in the set of channels. For example, a first direction-angle 403A (e.g., "North") can be assigned to a "green" color channel, a second direction-angle 403B (e.g., "East") can be assigned to a "red" color channel, and a third direction-angle 403C (e.g., "Down") can be assigned to a "blue" color channel. In some embodiments, when making a false-color direction-angle image, the intensity of each color in each voxel can be a function of the magnitude of each of the direction-angles 403A-403C.

In one illustrative and non-limiting example, the example 3D orientation 400 shows how the direction-angles of a line can be the angles that correspond to the direction cosines, while the orientation of interest can be (i) a line, such as a seismic velocity anisotropy vector, or (ii) a plane, such as a seismic reflector, where the orientation of the plane is expressed as the line perpendicular to the plane, which can be referred to as a "pole." The unit vector 401 shown in FIG. 4 can be the pole to a plane, such as a planar orientation in a dip-angle dip-azimuth volume. The direction-angles of the pole are the angles that correspond to the direction cosines of the pole (e.g., the angles between the pole and the coordinate axes). For example, three representative direction-angles can be computed with reference to other vectors describing the plane, such as the dip-vector. In some aspects, the techniques described herein are applicable to linear orientations (both axes and vectors) and planar orientations with or without a sense (a facing direction is an example of sense or handedness of a plane). Direction-angles can be computed with reference to any coordinate system. For example, in geology, the coordinate axes can be East, North, and Down. However, the techniques described herein can be used with reference to any coordinate reference system such as inline, crossline, and depth or time; or to an arbitrarily oriented set of axes, such as local coordinates defined by the geometry of folded rocks.

As a foundation for some embodiments, FIG. 4 shows the pole (unit vector 401) to a plane in a North-East-Down coordinate system. The direction cosines 404A-404C of the pole are shown by dots on the coordinate axes 402A-402C. The direction-angles 403A-403C are shown in the color that corresponds to the axis (North, East, or Down) from which they are measured. Direction-angles vary linearly with orientation, not trigonometrically like direction cosines. In some aspects, no modulo-360 computations relative to a measurement convention may be required, which makes the direction-angles useful for machine-learning and multivariate-statistics applications.

FIGS. 5A and 5B show vertical slices of a solid 3D example direction-angle image 500 indicative of a discrete 3D representation of the geologic volume and a set of geologic attributes associated with a geologic volume, according to some embodiments. In some embodiments, one or more of the operations described below with reference to FIG. 5 may be performed or otherwise carried out by one or more components of the computing environment 100, the computer system 700, or a combination thereof.

As shown in FIG. 5A, the example direction-angle image 500 is a vertical seismic section from a geologic volume in south Texas where each of the three direction-angles (e.g., North, East, and Down) is assigned to a color channel in the red-green-blue (RGB) color system and the seismic reflection amplitude is in grayscale. In other embodiments, each of the direction-angles can be assigned to a color channel in the cyan-magenta-yellow-black (CMYK) color system, the hue-saturation-brightness (HSB) color system, the hue-saturation-lightness (HSL) color system, a luma-chrominance color system (e.g., YPbPr, YCbCr, YUV), or any other suitable color system. In some aspects, the direction-angles can be plotted in a four-color mapping system, such as CMYK, where the three direction-angles are used as three of the color channels and another data set, such as a seismic attribute, is used as the fourth color channel.

In some embodiments, the system, with or without user input, can select which direction-angles are assigned to which color channel and whether larger values represent a stronger or weaker color response. In some embodiments, the entire range of each color channel can be used to display either the entire range of the data or a portion of the data (e.g., by clipping the data), as specified by the system or user input. In some embodiments, the color channel response may be stretched to match the range of the data. For example, for a channel having 256 color levels, if the color levels available in the channel range from 0 to 255, and the direction-angles in the dataset range from 0° to 180°, then the color channel response can be stretched such that 0=0° and 255=180°. In another example, if the direction-angles in the channel only range from 0° to 27°, then the color channel response can be stretched such that 0=0° and 255=27°. In yet another example, the color channel response can be manipulated in more complex ways, such as by having a non-linear relationship between color channel response and direction-angle magnitude.

In some embodiments, as shown in FIG. 5A, the example direction-angle image 500 may be a "false-color" image where the structural seismic data (e.g., the reflection-amplitude image) is assigned to a "grayscale" channel, a first direction-angle (e.g., "North") is assigned to a "green" channel, a second direction-angle (e.g., "East") is assigned to a "red" channel, and a third direction-angle (e.g., "Down") is assigned to a "blue" channel. Color is a function of seismic reflector orientation and does not change with the orientation of the slice through the data volume. In other words, the color does not change with the slice orientation. Each individual voxel is a constant color, and slicing the volume reveals voxels so that their colors can be seen or identified. An example region 501 of the example direction-angle image 500 can be identified as a region of interest for further analysis and processing.

As shown in FIG. 5B, a geologic feature 502 (e.g., a fold limb) can be identified in the example region 501 as a result of the false-coloring of the example direction-angle image 500 based on the magnitudes or intensities of the set of direction-angles included in each of the set of 3D orientations. Layering in the green panel has a consistent orientation that is different from the layer orientations to the left and right, which appear red. The boundaries between the colors are the intersections of the axial surfaces with the plane of the cross-section. In some embodiments, the geologic feature 502 can be identified automatically based on a correlation of the set of 3D orientations with a set of other measurements of properties of the geologic volume. In some embodiments, fold axial planes in the example region 501 are identifiable as sharp planes or surfaces that can be clearly differentiated by color but are either not visible or cannot be picked accurately in the grayscale reflection amplitude data.

Figure 6:
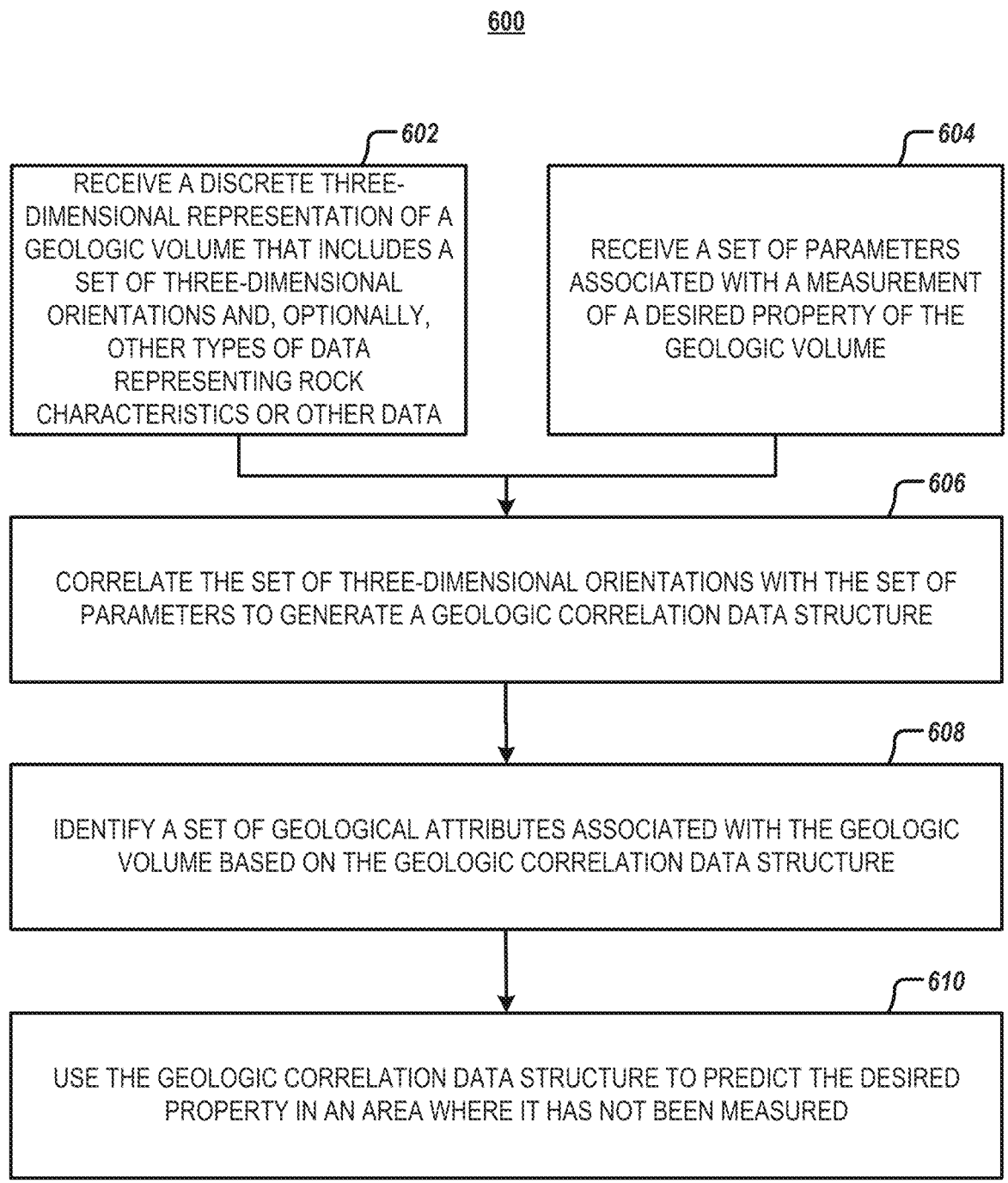
FIG. 6 is a flowchart illustrating a process for identifying suitable sites for harvesting geothermal heat, according to some embodiments.

Example Method for Identifying Suitable Sites for Harvesting Geothermal Heat FIG. 6 is a flowchart for a method 600 for identifying suitable sites for harvesting geothermal heat and, in some embodiments, visualizing geologic orientation data in geothermal site selection, according to an embodiment. It is to be understood that method 600 can be additionally or alternatively used to find oil and gas, to identify fractured rock volumes of interest in mining or geotechnical work, or in various other applications. Method 600 can be performed by processing logic that can include hardware (e.g., circuitry, dedicated logic, programmable logic, microcode, etc.), software (e.g., instructions executing on a computing device), or a combination thereof. It is to be appreciated that not all steps may be needed to perform the disclosure provided herein. Further, some of the steps may be performed simultaneously, or in a different order than shown in FIG. 6, as will be understood by a person of ordinary skill in the art.

Method 600 shall be described with reference to FIGS. 1, 2, 4, and 5B. However, method 600 is not limited to those example embodiments.

In 602, geologic volume modeling system 140 receives a discrete 3D representation of a geologic volume comprising a set of 3D orientations in the geologic volume and, optionally, other types of data representing rock characteristics or other data. Each 3D orientation (e.g., example 3D orientation 400) in the set of 3D orientations can be represented as a set of direction-angles 403A-403C assigned to a set of channels (e.g., color channels). Each direction-angle in the set of direction-angles 403A-403C can be assigned to a respective channel in the set of channels. In one example, each direction cosine in the set of direction cosines 404A-404C can correspond to a respective magnitude or intensity associated with a respective direction-angle in the set of direction-angles 403A-403C for a respective 3D orientation in the set of 3D orientations. In another example, the set of direction cosines 404A-404C can be manipulated in more complex ways, such as by having a non-linear relationship between color channel response and the set of direction cosines 404A-404C (e.g., direction-angle magnitude).

In 604, geologic volume modeling system 140 receives a set of parameters (e.g., a set of other scalar-value measurements) associated with a measurement of a desired property of the geologic volume. The set of parameters can include, for example, the locations of production wells such as extraction well 220, a rock property such as porosity, or a seismic attribute.

In 606, geologic volume modeling system 140 correlates (e.g., using correlation system 142) the set of 3D orientations with the set of parameters to generate a geologic correlation data structure (e.g., correlated data).

In 608, geologic volume modeling system 140 identifies (e.g., using the geologic attribute and feature identification system 148) geologic features and/or attributes associated with the geologic volume based on the geologic correlation data structure. The geologic attributes can include, for example, the orientation of seismic reflectors, or the distance of a point from a fault. In another example, the geologic attributes can include, for example, one or more rock properties of the HSA 206 shown in FIG. 2.

In 610, geologic volume modeling system 140 uses the geologic correlation data structure to predict the desired property in an area where it has not been measured.

Optionally, in some additional or alternative embodiments, method 600 may be performed according to the following example operations Data sets about the geological volume of interest can be loaded into a computer. The data sets may have values at every point in the volume, such as a reflection seismic attribute, or they may only have values at certain points, such as rock properties measured along a wellbore, or a passive seismic attribute. Non-rock properties may be included such as wellbore length and orientation. Hundreds of different types of properties may be loaded. At least one of the data types loaded is a desired property that a user wants to predict, such as the productivity of a well, or the porosity of a sedimentary stratum. Multivariate statistics, a neural network, any other suitable techniques, or a combination thereof, are then applied to the input data to develop a method to predict the desired property from the other data types and to determine what influences the desired property and how strong that influence is. In other words, the method is analogous to a multidimensional version of fitting a line through an X, Y scatter plot to predict one property from another. Direction-angles are another data type that is used in this process. In a simple analysis, direction-angles can be used as the only predictor. In a more complex analysis, direction-angles can be used together with multiple other data types.

Example Computer System

Figure 7:
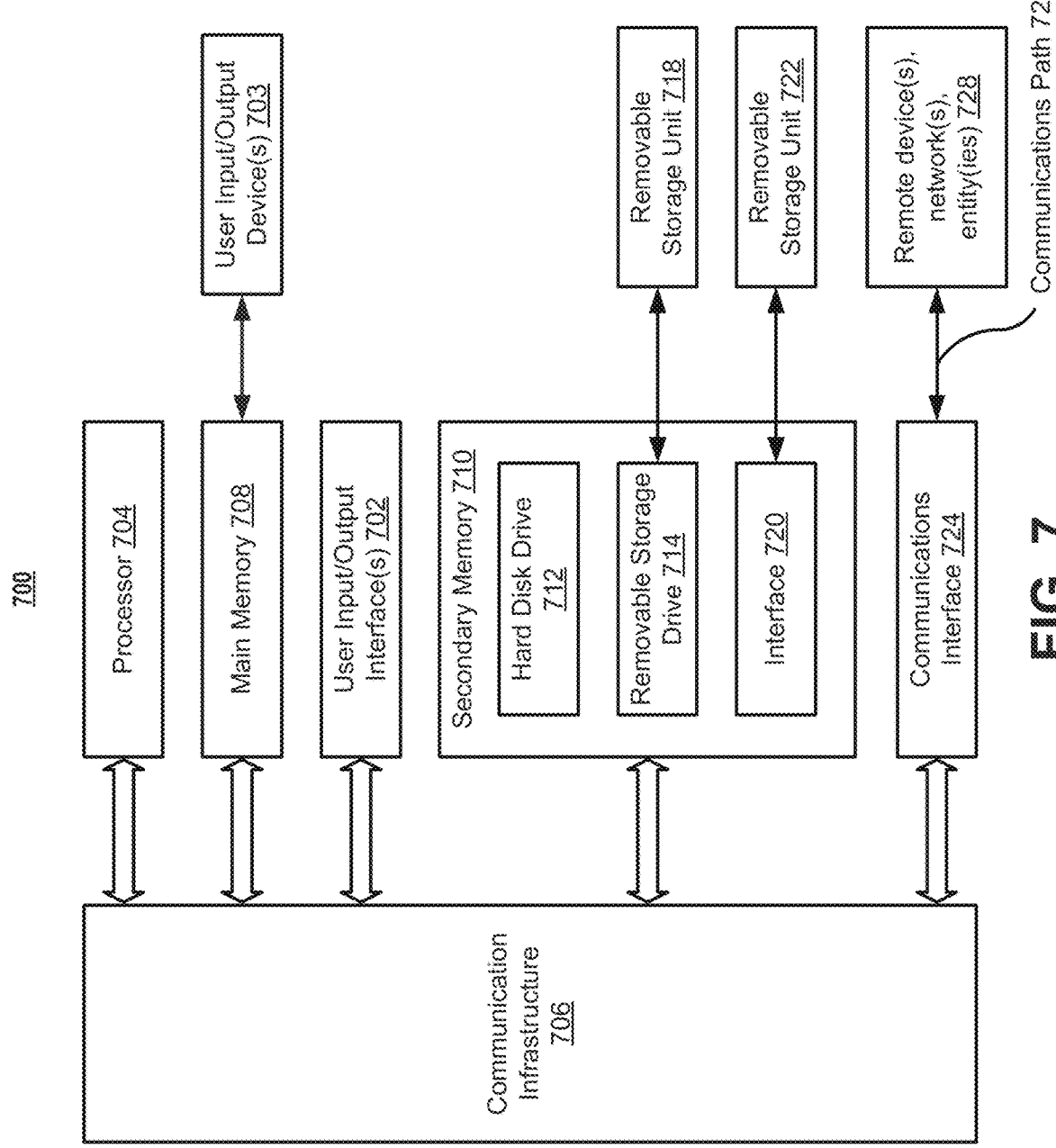
FIG. 7 illustrates an example computer system for implementing various embodiments.

Various embodiments may be implemented, for example, using one or more well-known computer systems, such as computer system 700 shown in FIG. 7. For example, the systems, devices, components, and/or structures disclosed herein may be implemented using combinations or sub-combinations of computer system 700. Additionally or alternatively, computer system 700 can include one or more computer systems that may be used, for example, to implement any of the embodiments discussed herein, as well as combinations and sub-combinations thereof.

Computer system 700 may include one or more processors (also called central processing units, or CPUs), such as one or more processors 704. In some embodiments, one or more processors 704 may be connected to a communications infrastructure 706 (e.g., a bus).

Computer system 700 may also include user input/output device(s) 703, such as monitors, keyboards, pointing devices, etc., which may communicate with communications infrastructure 706 through user input/output interface(s) 702.

One or more of the one or more processors 704 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 700 may also include a main memory 708 (e.g., a primary memory or storage device), such as random access memory (RAM). Main memory 708 may include one or more levels of cache. Main memory 708 may have stored therein control logic (e.g., computer software) and/or data.

Computer system 700 may also include one or more secondary storage devices or memories such as secondary memory 710. Secondary memory 710 may include, for example, a hard disk drive 712, a removable storage drive 714 (e.g., a removable storage device), or both. Removable storage drive 714 may be a floppy disk drive, a magnetic tape drive, a compact disk drive, an optical storage device, tape backup device, and/or any other storage device/drive.

Removable storage drive 714 may interact with a removable storage unit 718. Removable storage unit 718 may include a computer usable or readable storage device having stored thereon computer software (e.g., control logic) and/or data. Removable storage unit 718 may be a floppy disk, magnetic tape, compact disk, DVD, optical storage disk, and/any other computer data storage device. Removable storage drive 714 may read from and/or mite to removable storage unit 718.

Secondary memory 710 may include other means, devices, components, instrumentalities or other approaches for allowing computer programs and/or other instructions and/or data to be accessed by computer system 700. Such means, devices, components, instrumentalities or other approaches may include, for example, a removable storage unit 722 and an interface 720. Examples of the removable storage unit 722 and the interface 720 may include a program cartridge and cartridge interface (such as that found in video game devices), a removable memory chip (such as an EPROM or PROM) and associated socket, a memory stick and USB or other port, a memory card and associated memory card slot, and/or any other removable storage unit and associated interface.

Computer system 700 may further include a communications interface 724 (e.g., a network interface). Communications interface 724 may enable computer system 700 to communicate and interact with any combination of external devices, external networks, external entities, etc. (individually and collectively referenced by reference number 728). For example, communications interface 724 may allow computer system 700 to communicate with external devices 728 (e.g., remote devices) over communications path 726, which may be wired and/or wireless (or a combination thereof), and which may include any combination of LANs, WANs, the Internet, etc. Control logic and/or data may be transmitted to and from computer system 700 via communications path 726.

Computer system 700 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 700 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 700 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture including a tangible, non-transitory computer useable or readable medium having control logic (software) stored thereon may also be referred to herein as a computer program product or program storage device. This includes, but is not limited to, computer system 700, main memory 708, secondary memory 710, removable storage unit 718, and removable storage unit 722, as well as tangible articles of manufacture embodying any combination of the foregoing. Such control logic, when executed by one or more data processing devices (e.g., one or more computing devices, such as the computer system 700 or the one or more processors 704), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 7. In particular, embodiments can operate with software, hardware, and/or operating system implementations other than those described herein.

CONCLUSION

It is to be appreciated that the Detailed Description section, and not any other section, is intended to be used to interpret the claims. Other sections can set forth one or more but not all example embodiments as contemplated by the inventor, and thus, are not intended to limit this disclosure or the appended claims in any way.

While this disclosure describes example embodiments for example fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described example embodiments, but should be defined only in accordance with the following claims and their equivalents.

What is claimed is:

1. A method comprising:
   receiving, by one or more computing devices, a discrete three-dimensional representation of a geologic volume comprising a set of three-dimensional orientations in the geologic volume, wherein:
      each three-dimensional orientation in the set of three-dimensional orientations is represented as a set of direction-angles measured relative to a set of coordinate axes,
      each direction-angle in the set of direction-angles is a scalar value, and
      each direction-angle in the set of direction-angles is assigned to a respective channel in a set of channels;
   receiving, by the one or more computing devices, a set of other measurements of properties of the geologic volume;
   correlating, by the one or more computing devices, the set of three-dimensional orientations with the set of other measurements to generate a geologic correlation data structure;
   identifying, by the one or more computing devices, a geologic feature or a geologic attribute associated with the geologic volume based on the geologic correlation data structure;
   training a direction-angle classifier machine learning model comprising a process of:
      generating, for each direction-angle in the set of direction-angles, a respective probability value that the respective direction-angle corresponds to a property of a hot sedimentary aquifer (HSA),
      modifying, based on the respective probability value generated for the respective direction-angle, each direction-angle in the set of direction-angles to generate a set of modified direction-angles, and
      generating a set of classified direction-angles based on the set of modified direction-angles;
   classifying, by the one or more computing devices, each direction-angle in the set of direction-angles as a classified direction-angle in the set of classified direction-angles using the direction-angle classifier machine learning model;
   generating, by the one or more computing devices, a set of classified three-dimensional orientations based on the set of classified direction-angles;
   correlating, by the one or more computing devices, the set of classified three-dimensional orientations with the set of other measurements to generate a classified geologic correlation data structure; and
   identifying, by the one or more computing devices, the geologic feature or the geologic attribute associated with the geologic volume based on the classified geologic correlation data structure.

2. The method of claim 1, wherein the set of three-dimensional orientations comprises a set of transformed three-dimensional orientations.

3. The method of claim 2, wherein the set of transformed three-dimensional orientations comprises a set of three-dimensional orientations relative to a different set of coordinate axes.

4. The method of claim 1, wherein each direction-angle in the set of direction-angles corresponds to a coordinate system defined by a geometry of a volume of folded rocks in the geologic volume.

5. The method of claim 1, wherein:
   at least one direction-angle in the set of direction-angles is indicative of one or more structural features, sedimentary features, stratigraphic features, or seismic-stratigraphic features in the geologic volume; and
   the identified geologic attribute comprises the one or more structural features, sedimentary features, stratigraphic features, or seismic-stratigraphic features in the geologic volume.

6. The method of claim 1, further comprising:
   generating, by the one or more computing devices, a classified discrete three-dimensional representation of the geologic volume based on the set of classified three-dimensional orientations; and
   generating, by the one or more computing devices, a classified direction-angle image indicative of the classified discrete three-dimensional representation of the geologic volume and the geologic feature or the geologic attribute associated with the geologic volume.

7. The method of claim 1, further comprising:
   assigning, by the one or more computing devices, each direction-angle in the set of direction-angles to the respective channel in the set of channels.

8. The method of claim 1, wherein the set of channels comprises a set of color channels.

9. A system, comprising:
   a memory configured to store operations; and
   one or more processors configured to perform the operations, the operations comprising:
      receiving a discrete three-dimensional representation of a geologic volume comprising a set of three-dimensional orientations in the geologic volume, wherein:
         each three-dimensional orientation in the set of three-dimensional orientations is represented as a set of direction-angles measured relative to a set of coordinate axes,
         each direction-angle in the set of direction-angles is a scalar value, and
         each direction-angle in the set of direction-angles is assigned to a respective channel in a set of channels;
      receiving a set of other measurements of properties of the geologic volume;
      correlating the set of three-dimensional orientations with the set of other measurements to generate a geologic correlation data structure; and identifying a geologic feature or a geologic attribute associated with the geologic volume based on the geologic correlation data structure;

training a direction-angle classifier machine learning model via a process comprising:
generating, for each direction-angle in the set of direction-angles, a respective probability value that the respective direction-angle corresponds to a property of a hot sedimentary aquifer (HSA),
modifying, based on the respective probability value generated for the respective direction-angle, each direction-angle in the set of direction-angles to generate a set of modified direction-angles, and
generating a set of classified direction-angles based on the set of modified direction-angles;

classifying each direction-angle in the set of direction-angles as a classified direction-angle in the set of classified direction-angles using the direction-angle classifier machine learning model;

generating a set of classified three-dimensional orientations based on the set of classified direction-angles;

correlating the set of classified three-dimensional orientations with the set of other measurements to generate a classified geologic correlation data structure; and identifying the geologic feature or the geologic attribute associated with the geologic volume based on the classified geologic correlation data structure.

10. The system of claim 9, wherein the set of three-dimensional orientations comprises a set of transformed three-dimensional orientations.

11. The system of claim 10, wherein the set of transformed three-dimensional orientations comprises a set of rotated three-dimensional orientations.

12. The system of claim 9, wherein each direction-angle in the set of direction-angles corresponds to a coordinate system defined by a geometry of a volume of folded rocks in the geologic volume.

13. The system of claim 9, wherein:
at least one direction-angle in the set of direction-angles is indicative of one or more structural features, sedimentary features, stratigraphic features, or seismic-stratigraphic features in the geologic volume; and
the identified geologic attribute comprises the one or more structural features, sedimentary features, stratigraphic features, or seismic-stratigraphic features in the geologic volume.

14. The system of claim 9, wherein the operations further comprise:
generating a classified discrete three-dimensional representation of the geologic volume based on the set of classified three-dimensional orientations; and
generating a classified direction-angle image indicative of the classified discrete three-dimensional representation of the geologic volume and the geologic feature or the geologic attribute associated with the geologic volume.

15. The system of claim 9, wherein the operations further comprise:
assigning each direction-angle in the set of direction-angles to the respective channel in the set of channels.

16. The system of claim 9, wherein the set of channels comprises a set of color channels.

17. A non-transitory computer-readable storage device having instructions stored thereon that, when executed by at least one computing device, cause the at least one computing device to perform operations comprising:
receiving a discrete three-dimensional representation of a geologic volume comprising a set of three-dimensional orientations in the geologic volume, wherein:
each three-dimensional orientation in the set of three-dimensional orientations is represented as a set of direction-angles measured relative to a set of coordinate axes,
each direction-angle in the set of direction-angles is a scalar value, and
each direction-angle in the set of direction-angles is assigned to a respective channel in a set of channels;
receiving a set of other measurements of properties of the geologic volume;
correlating the set of three-dimensional orientations with the set of other measurements to generate a geologic correlation data structure;
identifying a geologic feature or a geologic attribute associated with the geologic volume based on the geologic correlation data structure;
training a direction-angle classifier machine learning model trained by a process comprising:
generating, for each direction-angle in the set of direction-angles, a respective probability value that the respective direction-angle corresponds to a property of a hot sedimentary aquifer (HSA),
modifying, based on the respective probability value generated for the respective direction-angle, each direction-angle in the set of direction-angles to generate a set of modified direction-angles, and
generating a set of classified direction-angles based on the set of modified direction-angles;
classifying each direction-angle in the set of direction-angles as a classified direction-angle in the set of classified direction-angles using the direction-angle classifier machine learning model;
generating a set of classified three-dimensional orientations based on the set of classified direction-angles;
correlating the set of classified three-dimensional orientations with the set of other measurements to generate a classified geologic correlation data structure; and
identifying the geologic feature or the geologic attribute associated with the geologic volume based on the classified geologic correlation data structure.

18. The non-transitory computer-readable storage device of claim 17, wherein the set of three-dimensional orientations comprises a set of transformed three-dimensional orientations.

* * * * *